United States Patent [19]
Kwok

[11] Patent Number: 6,116,730
[45] Date of Patent: Sep. 12, 2000

[54] FLANGE SECURED, MAGNETICALLY STABILIZED DESIGN LENS FOR MATING A PRIMARY AND AUXILIARY EYEGLASS FRAME

[75] Inventor: Chi Wah Kwok, Hong Kong, China

[73] Assignee: Ronald L. Darata, Pembroke Pines, Fla.

[21] Appl. No.: 09/351,429

[22] Filed: Jul. 12, 1999

[51] Int. Cl.⁷ ...................................................... G02C 7/28
[52] U.S. Cl. ................................................. 351/47; 351/57
[58] Field of Search .................................. 351/47, 57, 41, 351/44

[56] References Cited

U.S. PATENT DOCUMENTS 4,070,103   1/1978   Meeker .
5,416,537   5/1995   Sadler .
5,568,207  10/1996   Chao .

*Primary Examiner*—Hung Xuan Dang
*Attorney, Agent, or Firm*—Lambert & Associates; Gary E. Lambert; Randolph P. Calhouse

[57]  ABSTRACT

An eyeglass device for magnetically and securely attaching an auxiliary lens frame to a primary eyeglass frame. The relative motion of the auxiliary lens frame and the primary eyeglass frame is limited even when the wearer of the engaged and attached lenses is active due to the attractive magnetic forces of the engaged lenses and the flanges incorporated on the primary lens frame.

4 Claims, 4 Drawing Sheets

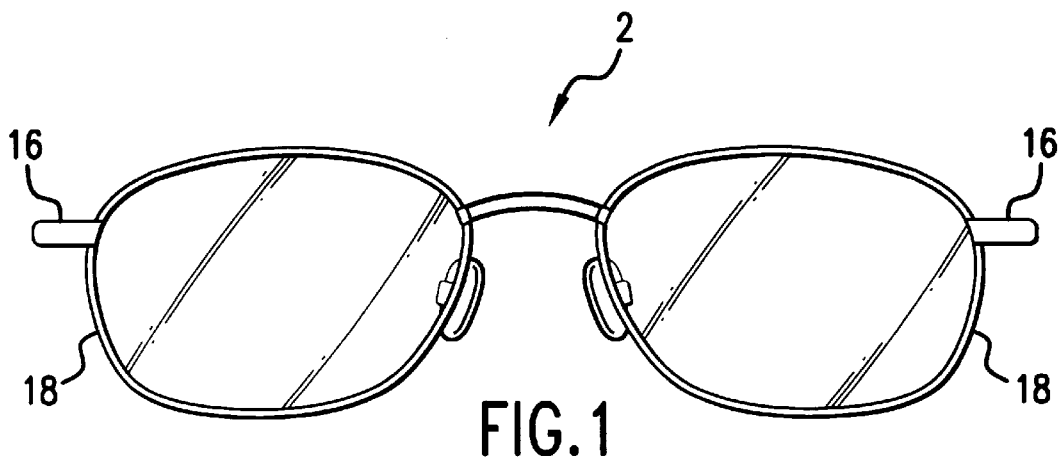
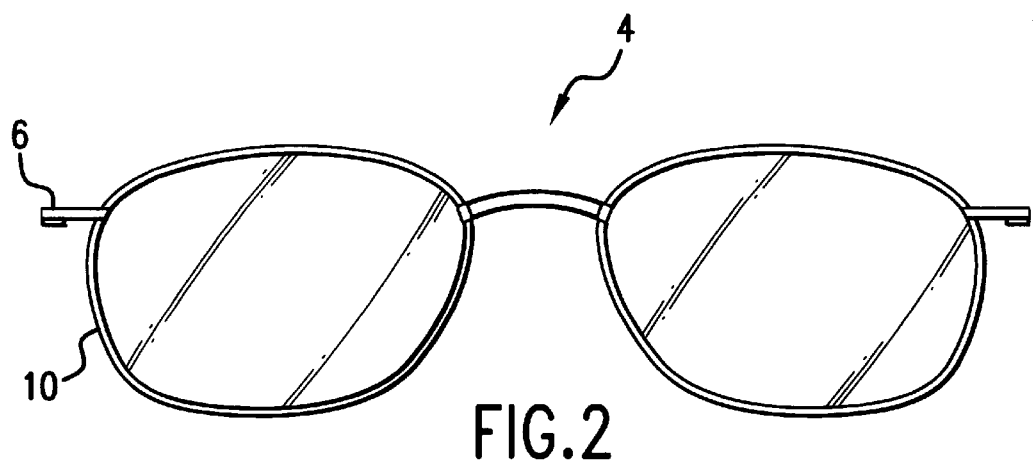

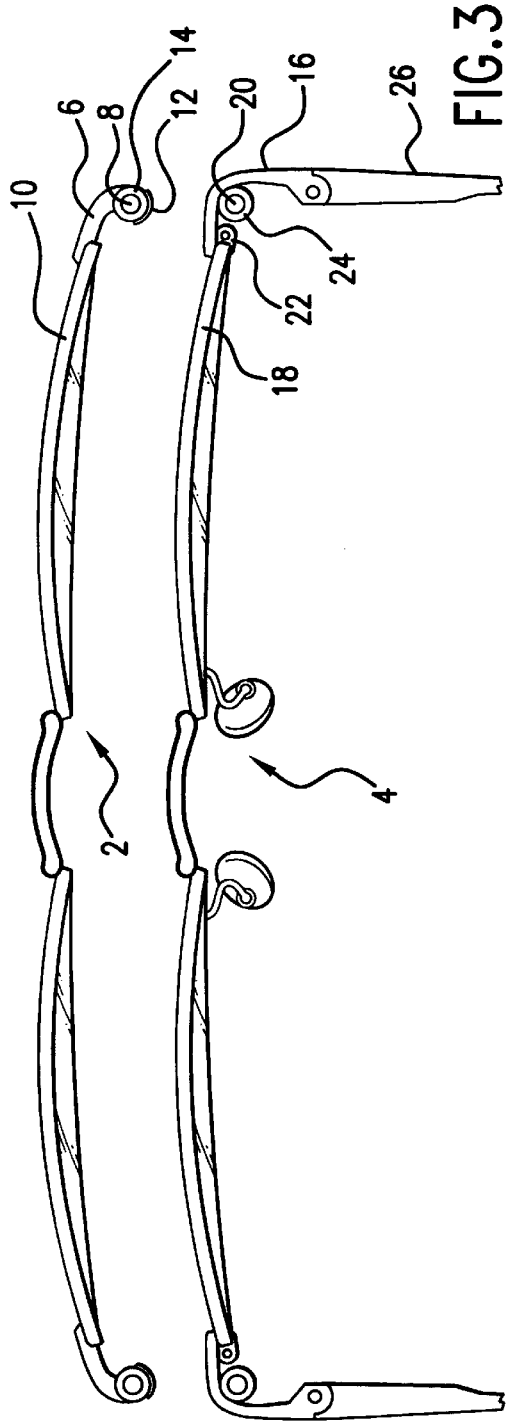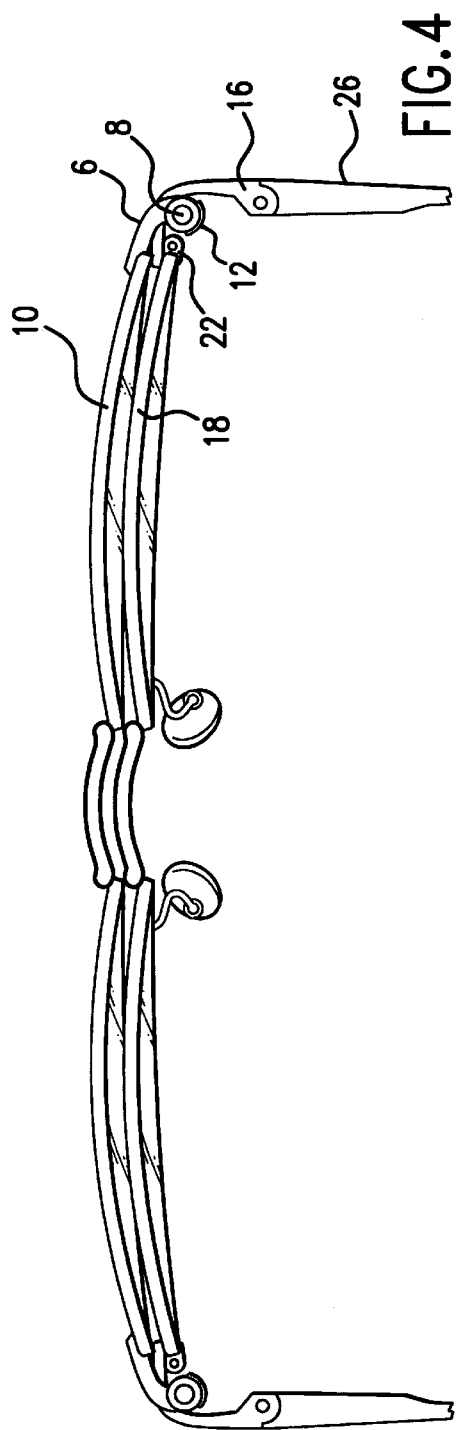

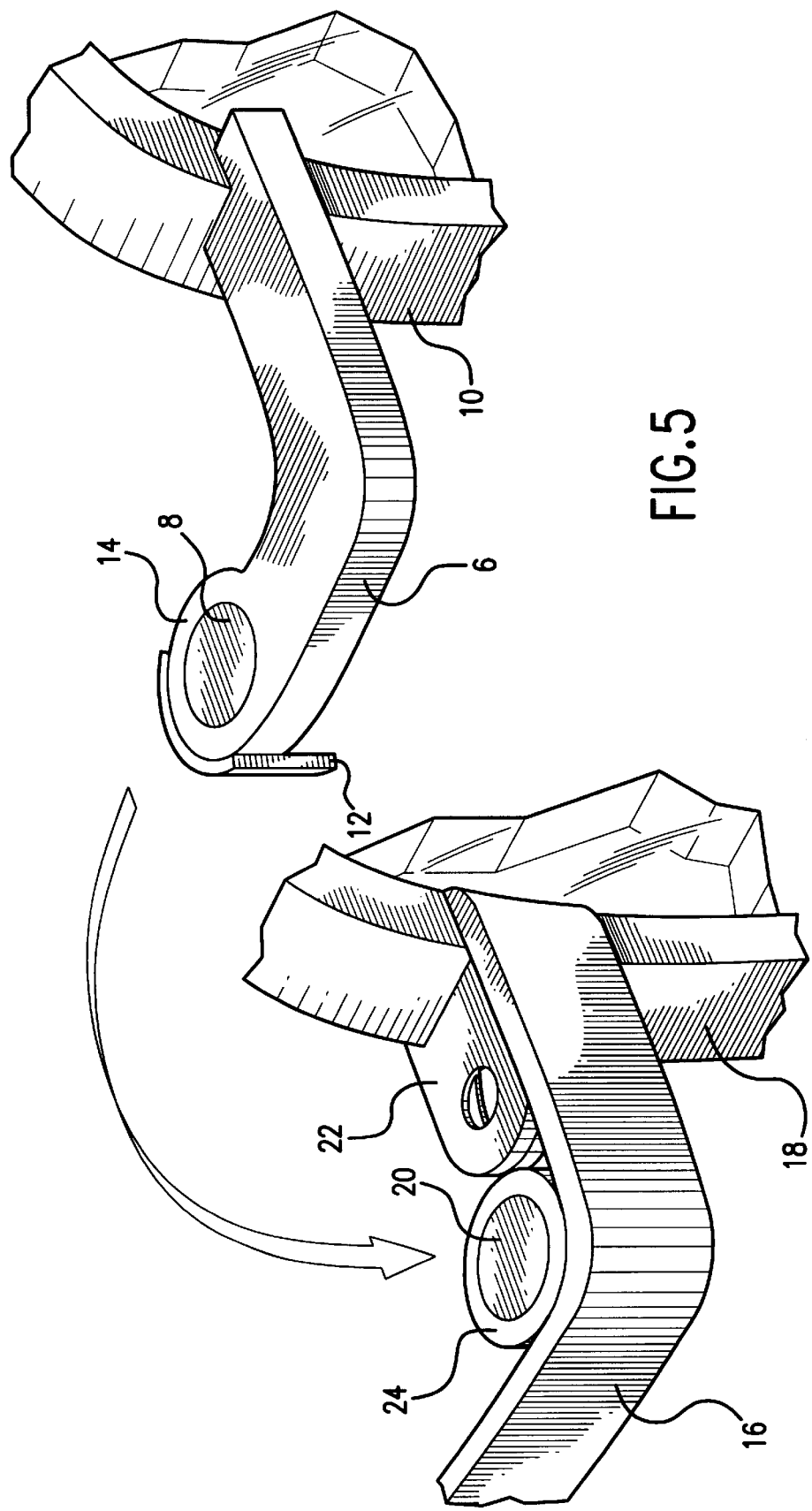

FLANGE SECURED, MAGNETICALLY STABILIZED DESIGN LENS FOR MATING A PRIMARY AND AUXILIARY EYEGLASS FRAME

BACKGROUND OF THE INVENTION

This invention relates to eyeglasses and auxiliary lens attachment devices. More particularly, the present invention relates to an auxiliary lens attachment frame that magnetically and securely attaches the auxiliary lenses to the eyeglasses, is easy to install, and yet unobtrusive.

It is often desirable to change the amount or type of light blocked, i.e. filtered, by eyeglass lenses. The desire to alter the amount of light filtered by eyeglass lenses may be necessitated by medical concerns, performance benefits or mere aesthetic preferences. Light filtering lenses having different light filtering properties are desired by eyeglass wearers in a vast variety of activities. By way of example, these activities include target gun shooting, fishing, snow skiing, daytime driving and nighttime driving. Due to the variety of reasons requiring lenses of differing light filtering properties, there is no one lens that can accomplish all of the possible lens light filtering requirements. As an alternative to the costly option of purchasing numerous sets of eyeglasses each having lenses of differing light filtering characteristics, numerous solutions have been proposed in the past to accommodate the need to alter or change the light filtering properties of eyeglass lenses.

There are eyeglass lenses for which the amount of light filtered varies depending on the amount of ambient light the lens is exposed to. While this type of lens may seem to overcome the problems noted above, these types of lenses tend to be limited as far as the amount and/or type of light filtering provided by a given lens. Additionally, once a set of eyeglasses is manufactured with particular lenses having given light filtering properties, the light filtering characteristics of the lens is fixed.

Other prior art attempts at addressing the above mentioned problems involve attaching auxiliary frames having lenses of the desired light filtering characteristics to the frame of eyeglasses. This approach is appealing because the auxiliary lenses can be manufactured to have the exact light filtering characteristics desired to suit the medical condition, activity or aesthetic preference of the wearer.

In the past auxiliary lenses have been attached to the primary eyeglass frame via a number of means. Clips of various sizes and configurations have been employed to attach the auxiliary lenses to the primary eyeglass frame. Clip mounted auxiliary lens devices attached to a primary eyeglass frame detract from the aesthetic shape and beauty of the primary eyeglasses because clips are unattractive, obtrusive and are not a usual or customary part of eyeglasses. Also, in order to achieve any sufficient amount of holding power, the clips of the auxiliary lenses must physically fit tightly onto the primary eyeglass frame. The need for a tight mechanical fit between the auxiliary lens frame and the primary eyeglass frame necessarily means that stresses and forces must be exerted on the auxiliary lenses and/or the eyeglass frame to attach the auxiliary lenses to the primary eyeglass frame. The need to place the primary eyeglass frame and/or the auxiliary lens frame under additional forces in order to attach the two together can damage the primary eyeglass frame and/or the auxiliary lens frame. The mechanical fit of the auxiliary frame and the primary eyeglass frame also tends to lessen over time.

Another method of attaching auxiliary lenses to eyeglass frames involves providing both the auxiliary lens frame and the primary eyeglass frame with attached magnets that attract and hold the auxiliary lens frame and the primary eyeglass frame together. U.S. Pat. No. 5,416,537, incorporated herein by this reference, discloses an auxiliary lens frame that magnetically engages with the primary eyeglass frame. According to this frame, mating magnets are attached externally and/or are embedded into the face of the primary eyeglass frame. This configuration results in an unattractively altered primary eyeglass frame having visibly attached magnets and/or requires specialty manufactured primary eyeglass frames that are expensive to manufacture and altered in integrity. The auxiliary lenses are attached to the primary eyeglass frame simply by the magnetic forces of the oppositely opposed but attracting mating magnets. The auxiliary lens frame is prone to become disengaged from the primary eyeglass frame when engaged and worn during movement by the wearer since the magnetic attraction forces alone are not great enough to prevent disengagement.

Also, U.S. Pat. No. 5,568,207, incorporated herein by this reference, discloses auxiliary lenses that magnetically engage with the primary eyeglass frame, The magnetic components of the auxiliary lens are positioned in direct contact with the side and rear of the primary eyeglass lens rim. In this disclosure frame, the primary eyeglass frame's magnetic members only directly support the magnetic members of the auxiliary lenses from downward disengagement. The disclosed frame also discloses the extension of the auxiliary lens frame's magnet to fit over the side end-piece of the primary eyeglass frame for the purported purpose of preventing the downward disengagement of the auxiliary lens.

SUMMARY OF THE INVENTION

It is therefore an object of this invention to provide an auxiliary lens frame that securely attaches to the primary eyeglass frame whereby disengagement of the auxiliary lens frame from the primary eyeglass frame is prevented in all directions.

It is a further object of this invention to provide an auxiliary lens frame that magnetically, quickly and easily attaches the auxiliary lens frame to the primary eyeglass frames.

It is a further object of this invention to provide an auxiliary lens frame that totally protects the magnetic members of the frame on both the auxiliary lens and the primary eyeglass frame thereby reducing the potential jarring and displacement of the magnetic members.

It is a further object of this invention to provide an auxiliary lens frame that does not interfere with the customary and normal manufacture of eyeglasses.

It is a further object of this invention to provide an auxiliary lens frame that does not interfere with the customary and normal maintenance of eyeglasses.

It is a further object of this invention to provide an auxiliary lens frame that is unobtrusive when magnetically engaged with the primary eyeglass frame, thereby not aesthetically distracting or unattractive.

This invention results from the realization that an attractive and relatively unobtrusive auxiliary lens frame for attachment to a primary eyeglass frame is effectuated by making the auxiliary lens frame with engaging magnets contained on two side projection members thereof in protective mounting collars, each having flanges that prevent the auxiliary lenses and primary eyeglass frame from becoming disengaged due to movement of the wearer when engaged. The flanges on the auxiliary lens frame's protective mounting collar is of the same curvature as the protective mounting collars of both the auxiliary lens frame and the primary eyeglass frame. There are corresponding magnets contained on the two side projection members of the primary eyeglass frame also contained in mounting collars. Thus, in total there are a total of four engaging magnets—two each on the auxiliary lens frame and two each on the primary eyeglass frame. The side projection members of the auxiliary frame are similar in shape to the side projection members of the primary eyeglass frame. The engaging magnets are each mounted flush with and enclosed within their respective protective mounting collars.

In the engaged and attached configuration, the auxiliary lens frame is quickly and easily attached to the primary eyeglass frame by placing the magnets of the auxiliary lenses on top of the magnets of the primary eyeglass frame. In doing so, the auxiliary lens frame is brought into close proximity with the primary eyeglass frame so that the magnets on the auxiliary lens frame are above and aligned with the corresponding and attracting magnets on the primary eyeglass frame. In the aligned position, the flange connected to the protective mounting collars of the auxiliary lens frame is positioned behind the protective mounting collars of the primary eyeglass frame.

The combination of the magnetic attraction of the corresponding magnets, the auxiliary lens frame's flange and the configuration and placement of the magnets maintains the auxiliary lens frame and the primary eyeglass frame in the engaged and attached position—even when the eyeglass wearer is active. Although previous prior art devices allege to maintain auxiliary lens devices and primary eyeglass frames in an attached configuration, the heretofore devices relied solely upon the magnetic attraction of the magnets (U.S. Pat. Nos. 4,070,103 and 5,416,537) or the attractive magnetic forces and/or the arrangement of the attracting magnets in a "hooking" configuration (U.S. Pat. No. 5,568, 207).

BRIEF DESCRIPTION OF THE DRAWINGS

FIG. 1 is a front view of a primary eyeglass frame in accordance with the present invention;

FIG. 2 is a front view of an auxiliary lens frame in accordance with the present invention;

FIG. 3 is a top view of an auxiliary lens frame and a primary eyeglass frame in accordance with the present invention;

FIG. 4 a top view of an auxiliary lens frame and a primary eyeglass frame engaged in the attached configuration in accordance with the present invention;

FIG. 5 is a detailed view of a side projection members of an auxiliary lens frame and a primary eyeglass frame in accordance with the present invention;

FIG. 8 is a top view of an auxiliary and primary eyeglass frame in according with the present invention.

DETAILED DESCRIPTION OF THE PREFERRED EMBODIMENT

Figure 6:
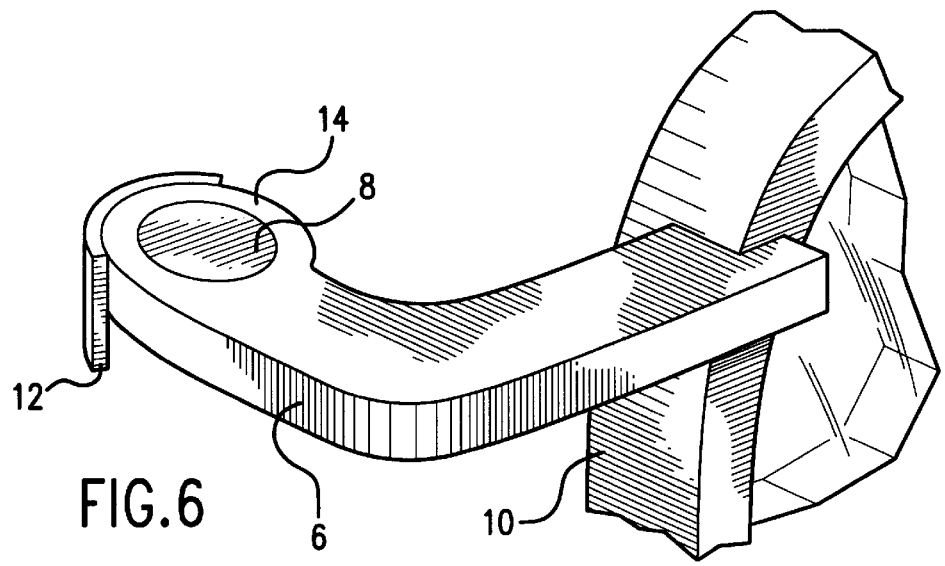
FIG. 6 is a detailed view of the side projection of an auxiliary lens frame in accordance with the present invention showing the flange on the protective mounting collar of the auxiliary lens frame.

With reference to FIG. 1, a primary eyeglass frame 2 according to the present invention is shown. The primary eyeglass frame 2 comprises two lenses, each contained in a lens rim 18. The primary lens frame 2 also has two side projection members 16 attached to and extending from the side of each lens rim 18.

FIG. 2 shows an auxiliary lens frame 4 in accordance with the present invention. The auxiliary lens frame 4 comprises two lenses, each contained in a lens rim 10. Similar to the primary eyeglass frame 2, the auxiliary lens frame 4 has two side projection members 10 attached to and extending from the side of each lens rim 10. It is important to note that in the preferred embodiment the overall shape of the auxiliary lens frame 4 has a shape similar to shape of the primary eyeglass frame 2. By having the auxiliary lens frame and the primary eyeglass frame of similar shape and design, the auxiliary lens and the primary eyeglass frame will fit together closely when engaged and attached to one another in an attractive configuration.

A fuller understanding of how the auxiliary lens and primary frame are constructed and fit together in the engaged arrangement can be had by referring to FIG. 3. FIG. 3 shows a top view of both the auxiliary lens frame 2 and the primary eyeglass frame 4. Although the primary eyeglass frame 2 and the auxiliary lens frame 4 are symmetrical in design, only one half of each is labeled for purposes of clarity. The top view of the auxiliary frame 2 shows the side projection members 6 attached to and extending from the side of the auxiliary frame's lens rim 10 as mentioned above. Additionally, FIG. 3 shows the magnetic members 8 of the auxiliary lens frame 2 enclosed in the auxiliary lens frame protective mounting collars 14. The protective mounting collars 14 are attached to the rear end portion of the side projection members 6 and completely surround and enclose the sides of the magnetic members 8. Flange 12 is also attached to the protective mounting collars 8. Flange 12 extends below the lower bottom edge of the protective mounting collar 14 and has a shape of similar curvature as the protective mounting collar 14. A better view of the structure of the auxiliary lenses frame can be seen in FIG. 6.

Figure 7:
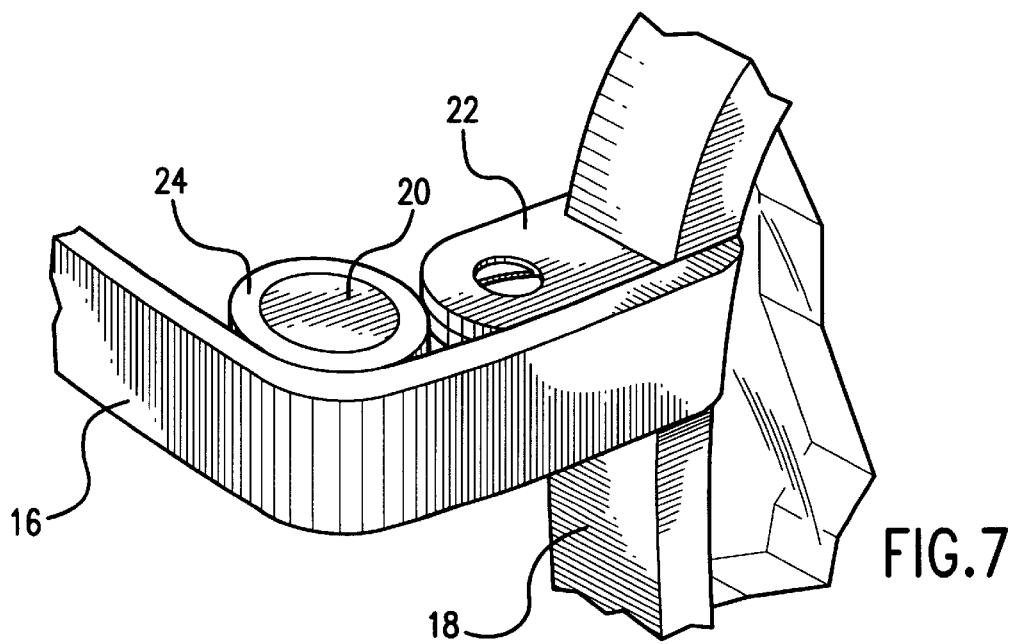
FIG. 7 is a detailed view of the side projection of the primary eyeglass frame in accordance with the present invention showing the protective mounting collar enclosing the magnetic member of the auxiliary lens frame.

FIG. 3 also depicts the side projection member 16 attached to and extending from the side of the primary eyeglass frame's lens rim 18. As shown, attached to the side projection member 16 is the protective mounting collar 24. The protective mounting collar 24 encloses and completely surrounds the sides of the primary frame's magnetic members 20. The protective mounting collar 24 is located on the side projection member 16 such that when the auxiliary lens frame 2 and primary eyeglass frame 4 of the preferred embodiment are aligned and engaged, the auxiliary lens rim 10 and primary eyeglass rim 18 lie one exactly atop the other. The protective mounting collar 24 is also attached to the side projection member 16 independently and separately from eyeglass frame lens tightening screw and housing 22. By having the protective mounting collar 24 separately located from the lens tightening screw and housing 22, the primary eyeglass frame 4 and lenses enclosed therein can be maintained in the normal and customary manner. By virtue of the protective mounting collars 20 placement on the primary eyeglass frame's side projection member 16, primary eyeglass frames 4 may be manufactured without the need for major modification of the primary eyeglass frame 4 manufacturing process since the protective collar 24 is separately located on the side projection member 16. Also, the protective collar 24 may be added to preexisting primary eyeglass frames without comprising the maintenance or structural integrity of the primary eyeglass frame. A better view of the primary eyeglass frame structure can be seen in FIG. 7.

FIG. 4 shows the auxiliary lens frame and the primary eyeglass frame in the engaged and attached configuration. The auxiliary lens frame is magnetically engaged with the primary eyeglass frame by bringing the rear of the auxiliary lens frame into close proximity with the front of the primary eyeglass frame while keeping the side projection members 6 of the auxiliary lens frame above the side projections members 16 of the primary eyeglass frame, see FIG. 5. Once the auxiliary lens frame and the primary eyeglass frame are in close proximity with each other, the auxiliary lens frame is lowered downward until the magnetic members 8 of the auxiliary lens frame and the magnetic members 20 of the primary eyeglass frame are aligned such that the magnetic members 8 are directly atop of magnetic members 20. In order to prevent jarring and possible dislocation of the magnetic members 8 and 20 from their respective mounting collars 14 and 24, the magnetic members 8 and 20 are mounted with their tops and bottoms flush with their respective protective mounting collars 14 and 24. In this manner, the magnetic members 8 and 20 are not exposed to possible jarring. In the aligned arrangement, the corresponding and mating magnetic members 8 and 20 of the auxiliary lens frame and the primary eyeglass frame are aligned and close enough to attract one another for holding the auxiliary lens frame and the primary eyeglass frame together in the aligned and engaged configuration. The magnetic attracting forces exerted by the engaged magnets 8 and 20 limits the relative up and down motion of the engaged auxiliary and primary eyeglass frame. Additionally, the flange 12 provides means for limiting the side to side motion of the engaged auxiliary lens frame and the primary eyeglass frame. The curved flange 12 extends downward beyond and behind the protective mounting collar 24 of the primary eyeglass frame in the engaged arrangement. Since the flange 12 has a curvature similar to the curvature of the primary eyeglass frame's protective mounting collars 24 and at least partially curves around mating protective mounting collar 24 in the engaged position, the flange 12 limits the side to side motion of the engaged auxiliary lens frame and the primary eyeglass frame. Therefore, the auxiliary lens frame and the primary eyeglass frame of the present invention are maintained in a magnetic and secured engaged configuration whereby disengagement of the auxiliary lens frame from the primary eyeglass frame is prevented in all directions.

As such, the method of making and using the frame detailed above constitutes the inventor's preferred embodiment and alternate embodiments to the invention. The inventor is aware that numerous configurations of the frame as a whole or some of its constituent parts are available which would provide the desired results. While the invention has been described and illustrated with reference to specific embodiments, it is understood that these and other embodiments may be resorted to without departing from the invention. Therefore, the form of the invention set out above should be considered illustrative and not as limiting the scope of the following claims.

What is claimed is:

1. An eyeglass device comprising:

a primary eyeglass frame including two lens rims for containing lenses in said primary eyeglass frame;

a pair of side projection members, each of said side projection members of said pair attached to and extending from the side of one of the two primary eyeglass lens rims of said primary eyeglass frame;

a pair of protective mounting collars disposed on said pair of side projection members, each one of said pair of protective mounting collars mounted on one of said pair of side projection members;

a pair of magnetic members, each of said pair of magnetic members enclosed in one of said pair of said protective mounting collars of said primary eyeglass frame;

an auxiliary lens frame for engaging and attachment with said primary eyeglass frame including two lens rims for containing lenses in said auxiliary lens frame;

a pair of side projection members, each of said side projection members attached to and extending from the side of one of said auxiliary lens frame's two lens rims;

a pair of protective mounting collars disposed on each of said pair of side projection members of said auxiliary lens frame, each one of said protective mounting collars terminating in an upper peripheral edge and a lower peripheral edge and mounted on each of said pair of auxiliary lens frame side projection members;

a pair of magnetic members, each of said pair of magnetic members having the entirety of their sides enclosed in one of said pair of said auxiliary lens frame protective mounting collars;

a pair of flanges, each of said flanges attached to and extending beyond the bottom peripheral edge of said protective mounting collars of said auxiliary lens frame, said flanges further having a curvature similar to the curvature of said pair of protective mounting collars of said primary eyeglass frame whereby the alignment of said auxiliary magnetic members directly atop said magnetic members of said primary eyeglass frame arranges the auxiliary lens frame and the primary eyeglass frame in the engaged configuration wherein the lens rims of said primary eyeglass frame and the lens rims of said auxiliary lens frame are aligned and the relative movement of the auxiliary lens frame and the primary eyeglass frame is restricted in all directions; in particular, movement in the up and down directions is primarily limited due to the magnetic attractive forces of said aligned auxiliary lens frame and said primary eyeglass frame magnetic members and relative movement in the side to side directions is limited primarily by said flanges attached to said auxiliary lens frame's protective mounting collars positioned behind said protective mounting collars of said primary eyeglass frame.

2. The eyeglass device of claim 1 wherein said flanges of said auxiliary frame at least partially curve around the corresponding mating primary eyeglass frame protective mounting collars when the auxiliary lens frame and primary eyeglass frame are arranged in the engaged configuration, thereby further limiting the relative movement of the auxiliary lens frame and the primary eyeglass frame.

3. The eyeglass device of claim 1 wherein said magnetic members of said auxiliary lens frame and said primary eyeglass frame are further enclosed in their respective protective mounting collars with the top and bottom of said magnetic members flush with the top and bottom peripheral edges of said protective mounting collars.

4. The eyeglass device of claim 1 wherein said primary eyeglass frame protective mounting collars are mounted separately from the primary eyeglass frame lens rims.

* * * * *